Patented Mar. 30, 1926.

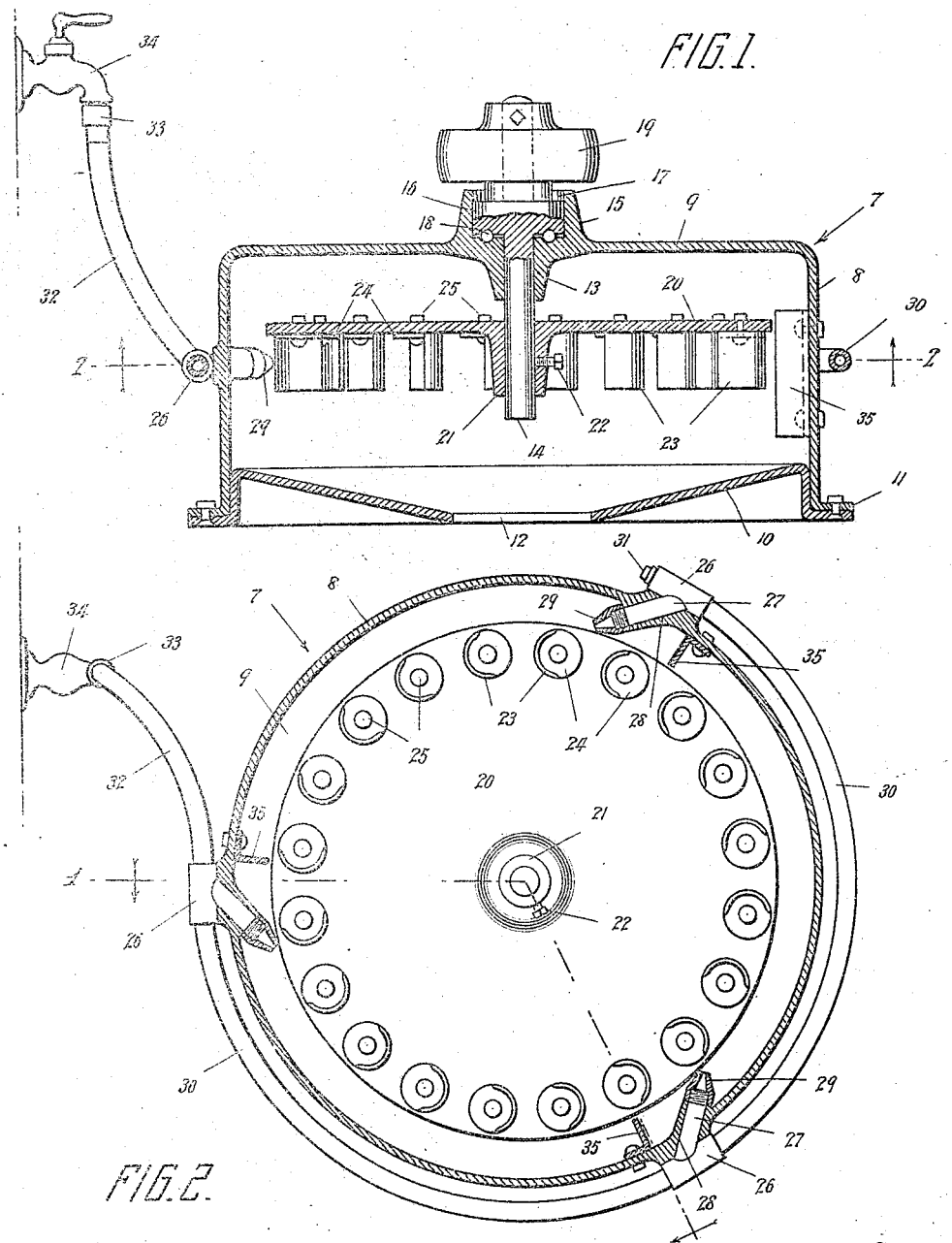

1,579,146

UNITED STATES PATENT OFFICE.

WALTER E. RICHARDSON, OF TUCSON, ARIZONA.

WATER MOTOR.

Application filed February 11, 1925. Serial No. 8,448.

*To all whom it may concern:*

Be it known that I, WALTER E. RICHARDSON, a citizen of the United States, residing at Tucson, in the county of Pima and State of Arizona, have invented certain new and useful Improvements in Water Motors, of which the following is a specification, reference being had therein to the accompanying drawing.

The present invention relates to water motors, and aims to provide a novel and improved rotary water motor which will operate efficiently.

Another object of the invention is the provision of a water motor having a rotor of novel construction and mounted in a novel manner to effectively receive and transmit the impacts of the jets, and from which the water will pass quickly as soon as its force has been spent.

With the foregoing and other objects in view, which will be apparent as the description proceeds, the invention resides in the construction and arrangement of parts, as hereinafter described and claimed, it being understood that changes can be made within the scope of what is claimed, without departing from the spirit of the invention.

The invention is illustrated in the accompanying drawing, wherein—

Figure 1 is a vertical section of the motor, taken on the line 1—1 of Fig. 2.

Fig. 2 is a horizontal section on the line 2—2 of Fig. 1.

The casing 7 of the motor comprises the cylindrical wall 8, top 9 which is preferably integral with said wall, and a removable bottom 10 which has its edge portion overlapping and bolted or otherwise secured to an outstanding flange 11 with which the wall 8 is provided at its lower edge. As shown, the bottom 10 is of hopper form so as to slope from the wall of the casing to the central discharge opening 12 with which the bottom is provided, in order that the water will drain quickly from the casing through said opening 12.

The top 9 has a central depending bearing 13 and an upstanding annular flange 15 to accommodate the rotor shaft 14 which is journaled in the bearing 13 and provided with a collar or enlargement 16 within the recess 17 formed by the flange 15. The bottom of the recess 17 and lower surface of the collar 16 have complementary annular ball braces in which anti-frictional balls 18 travel to support the rotor before rotation with minimum friction. A pulley wheel 19 is secured to the upper protuding terminal of the shaft 14 to transmit the power.

The rotor comprises a flat horizontal disk 20 having a depending hub 21 fitted on the lower terminal of the shaft 14 which depends in the casing, said hub 21 being secured adjustably on the shaft by means of a set screw 22 or other clamping element. The buckets 23 of the rotor are made from sheet metal and are of arcuate cross-section, the buckets being semi-cylindrical with their concaved and convex sides disposed rearwardly and forwardly, respectively, with reference to the direction of rotation of the rotor. Said buckets depend from the lower surface of the disk 20, and are disposed adjacent to the edge of the disk. Said buckets have circular flanges 24 at their upper ends secured up against the disk by means of vertical bolts 25 or other securing elements, which when loosened permit the buckets to be adjusted about the vertical axes of said securing elements, in order that the buckets may be positioned to effectively receive the impact of the jets.

The water is discharged into the casing to impinge against the rotor at several points. Thus, couplings 26 are disposed at the exterior of the wall 8 and have oblique branches 27 projecting through openings 28 formed in the wall 8, and nozzles 29 are secured on the inner ends of the branches 27 for directing the streams or jets of water into the buckets 23 of the rotor. The couplings 26 are connected by arcuate pipes or sections of hose, as at 30, the coupling 26 at the end of the water conduit being closed by a plug 31. The water is supplied through a hose 32 connected to the coupling 26 at the receiving end of the water conduit formed by the hose sections or pipes 30 and couplings 26. Said hose 32 has a coupling 33 for attachment to a water faucet 34 or other source of water under pressure.

Vertical inwardly extending baffles 35 are secured to the wall 8 in order to prevent the whirling motion of the water in the casing when the water is thrown from the rotor by centrifugal force. This will prevent the water from accumulating in the casing by the whirling motion of the water therein which, as well known, retards the discharge of the water, inasmuch as the centrifugal force will hold the water adjacent to the wall 8 of the casing. However, with the baffles 35 the whirling motion of the water is prevented, and the water will discharge rapidly from the casing after leaving the rotor.

By having the buckets at the underside of the rotor, the water may drop freely from the rotor after its power is spent against the buckets, thereby reducing any tendency for the water to resist the movement of the rotor, and the spent water passes from the rotor as soon as its energy ceases. The water drops directly down from the rotor onto the bottom 10 to pass through the outlet 12, and the disk or body 20 of the rotor serves as a shield to prevent the water from splashing upwardly toward the bearing for the rotor shaft. This provides a desirable and efficient arrangement. Furthermore, the rotor may be adjusted vertically on the shaft 14 to position to the disk 20 different distances above the horizontal plane in which the nozzles 29 are disposed. The rotor will revolve with minimum friction and the action of the water against the buckets may even have a tendency to lift the rotor slightly so as to relieve the bearing of the weight of the rotor as well as obtaining maximum power. The buckets are open and unobstructed at their lower ends so that the water may drop freely from the buckets after the power of the streams or jets of water has been spent.

The buckets being curved will provide for an effective action of the water. Thus, when a bucket passes a nozzle the stream or jet of water first enters the bucket adjacent to one edge thereof, thereby causing the water to be deflected along the inner curved surface of the bucket and discharged in the reverse direction, so as to assist in driving the rotor by the reaction thus obtained. The water not only impinges against the bucket but is also deflected reversely to discharge rearwardly from the bucket to provide a reaction force. As the bucket moves away from the nozzle the jet or stream of water is directed into the bucket nearer to the center thereof so as to provide for increasing force of impact, and when the jet or stream of water strikes the intermediate portion of the bucket the water is divided and reflected to the opposite edges of the bucket and rearwardly therefrom. The deflection of the streams or jets of water by the buckets may be regulated or controlled by the adjustment of the buckets around the axes of the bolts or securing elements 25, to obtain variations in the deflection of the water from the inner and outer edges of the buckets.

Having thus described the invention, what is claimed as new is:

1. A water motor comprising a rotor member, concaved buckets, means securing said buckets to said rotor member for the adjustment of said buckets about axes substantially parallel with the axis of the rotor member, and means for directing water into said buckets.

2. A water motor comprising a rotor member, an annular series of plates, means securing said plates to said member for adjustment about axes substantially parallel with the axis of the rotor member, concaved buckets carried by and extending from said plates, and means for directing water into said buckets.

3. A water motor comprising a horizontal disk mounted for rotation about a vertical axis, an annular series of plates bearing upwardly against the lower surface of the disk, vertical clamping elements securing said plates to the disk for the adjustment of said plates around the vertical axes of said clamping elements, buckets depending from said plates having concaved sides facing rearwardly with reference to the direction of rotation of the disk and having their lower ends open, and means for directing water under the disk into said buckets.

In testimony whereof I hereunto affix my signature.

WALTER E. RICHARDSON.